(12) United States Patent
Campbell

(10) Patent No.: US 8,898,865 B2
(45) Date of Patent: Dec. 2, 2014

(54) SEAT BELT ADJUSTER

(76) Inventor: Terry A. Campbell, Prince George (CA)

(*) Notice: Subject to any disclaimer, the term of this patent is extended or adjusted under 35 U.S.C. 154(b) by 77 days.

(21) Appl. No.: 13/466,987

(22) Filed: May 8, 2012

(65) Prior Publication Data

US 2013/0298354 A1 Nov. 14, 2013

(51) Int. Cl.
*A44B 11/00* (2006.01)
*B60R 22/30* (2006.01)
*B60R 22/02* (2006.01)

(52) U.S. Cl.
CPC .................................. *B60R 22/024* (2013.01)
USPC .................. 24/169; 24/170; 24/198; 24/487; 24/564

(58) Field of Classification Search
USPC ........... 24/170, 198, 169, 186, 199, 307, 487, 24/564
See application file for complete search history.

(56) References Cited

U.S. PATENT DOCUMENTS

| | | | | |
|---|---|---|---|---|
| 3,823,443 A * | 7/1974 | Takabayashi | | 24/186 |
| 3,824,654 A * | 7/1974 | Takabayashi | | 24/198 |
| 4,038,726 A * | 8/1977 | Takabayashi | | 24/198 |
| 5,088,161 A * | 2/1992 | Robertson | | 24/305 |
| 5,201,099 A * | 4/1993 | Campbell | | 24/198 |
| 5,577,395 A * | 11/1996 | Kuykendall | | 63/3 |
| 5,979,095 A * | 11/1999 | Schneider et al. | | 40/633 |
| 6,145,169 A * | 11/2000 | Terzuola et al. | | 24/170 |
| 6,510,592 B1 * | 1/2003 | Hamilton | | 24/170 |
| 6,782,587 B2 * | 8/2004 | Reilly | | 24/198 |
| 7,013,535 B2 * | 3/2006 | Tracy | | 24/265 R |
| 7,657,977 B2 * | 2/2010 | Clifton, Jr. | | 24/170 |
| 7,808,386 B1 * | 10/2010 | Sayegh et al. | | 340/572.1 |
| 2003/0172500 A1 * | 9/2003 | Reilly | | 24/198 |

* cited by examiner

*Primary Examiner* — Robert J Sandy
*Assistant Examiner* — David Upchurch
(74) *Attorney, Agent, or Firm* — Cameron IP

(57) ABSTRACT

An improved seatbelt adjuster for holding the lap seatbelt to the shoulder belt of an automobile seatbelt. The seatbelt adjuster prevents the shoulder belt from rubbing against the neck of a wearer. The adjuster is made of a single unitary piece and therefore cannot be separated. A frame member formed of resilient material has a front portion, rear portion, top edge, bottom edge and space between the front and back portions for containing the lap seatbelt. A parallel pair of dual gussets and rails is molded into the back portion to increase the stiffness of the flap member particularly to prevent it spreading open in hot weather. A snap clip has been added to the flap to avoid inadvertent release in hot weather. A horn gate has been added to the slot to prevent snagging on clothing.

11 Claims, 3 Drawing Sheets

SEAT BELT ADJUSTER

CROSS-REFERENCE TO RELATED DOCUMENTS

This application refers to my issued U.S. Pat. No. 5,201,099 SEAT BELT ADJUSTER filed on May 27, 1992 and issued on Apr. 23, 1993.

TECHNICAL FIELD

The present invention relates to automobile seat belts and more specifically to improve the adjuster for holding together the lap seat belt and the shoulder belt at a location where the shoulder belt does not rub against the neck of a seat belt wearer.

BACKGROUND ART

Most seat belts used in vehicles, such as automobiles, trucks, etc., have a lap seat belt which extends across the lap of a wearer and also a shoulder belt which extends up from the attachment side of the belt across the wearer's shoulder, thus providing protection to the wearer from being thrown forward in the event of a sudden stop. The lap seat belt holds the wearer in the seat and the shoulder strap prevents the wearer from jack-knifing forward. Most types of seat belts are adjustable for different sized passengers and drivers. A lap seat belt passes from one side of a seat across the seat to a releasable catch or attachment buckle on the other side of the seat. The belt passes through the catch or attachment buckle and then becomes a shoulder belt crossing over the front of a wearer and being attached at shoulder height above the seat at the side where the seat belt is initially attached.

The problem with such types of seat belts is that the angle the shoulder belt from the catch or attachment buckle often extends across the neck of the wearer and this becomes irritating as it rubs against the skin. My patented seat belt adjuster U.S. Pat. No. 5,201,099 issued on Apr. 13, 1993 provides relief to this problem by holding the shoulder belt to the lap seat belt thereby avoiding skin contact of the shoulder belt.

Use of my original seat belt adjuster has identified a number of deficiencies in the original design which this application serves to correct in a novel and inventive manner. For example the main tongue of the seat belt adjuster proved to be insufficiently resilient particularly in hot weather where the interior temperature of an automobile may exceed 120° F. The tongue, under these temperatures, will soften and spread open thereby releasing the clip rendering it useless. Furthermore it was found that the seat belt was getting caught in the closure snap thereby preventing the adjuster from sliding. Another deficiency of the original invention was that the belt would slip out from under the tongue during use. In some circumstances, the wearer's clothing would snag on the fastening clip. The deficiencies of the original seat belt adjuster often resulted in the adjuster disengaging from the seat belt rendering it useless.

SUMMARY OF THE INVENTION

The present invention provides novel and inventive improvements over the original seat belt adjuster and overcomes the problems cited above.

In one embodiment of the invention there is an improved seat belt adjuster for holding a shoulder belt to a lap seat belt comprising a frame member having a top surface and a bottom surface, a front end and a rear end, a first side and a second side, a length, a first width and a second width. The second width is less than the first width giving the frame member a pinched appearance. The frame member encloses a rectangular opening having a length and a width. The frame member further comprises a shoulder belt clip member having a first end fixed at to a rear end of the frame member at the bottom surface of the frame member and a free end extending towards the front end of the frame member. The clip member terminates adjacent to the front end. The clip member has a first side and a second side and it is angled towards the rectangular opening. The clip member includes a length and width which is less than said length and width of the rectangular opening. The clip member also includes a first and a second parallel stiffening ridges projecting from a top surface of the clip member. The first parallel ridge is disposed a first distance inside of the clip member first side and the second parallel ridge is disposed the same distance inside of the clip member second side. The two parallel stiffening ridges commence at the fixed first end and terminate at a terminal or distal ends a second distance inside the free end of the clip member.

In one embodiment of the invention there is a rectangular aperture in the frame member for receiving a rectangular clasping member and a circular recess in the frame member for receiving a circular fastening pin.

The invention also includes a closure member having a length and a width, top surface, a bottom surface, a first side and a second side. The closure member further comprises a fixed end fixed to the top surface rear end of the frame member by a hinge located at said fixed end. The closure member pivots or folds from an open position to a closed position over the frame member thereby enclosing the lap seat belt. A free end of the closure member has a rectangular clasping member projecting therefrom. There is also a flat recessed portion between the fixed end and the free end defining a top of the lap seat belt containment channel. The circular fastening pin is located proximate to the fixed end.

In yet another embodiment of the invention there is a first set pins projecting from a top surface of the flat recessed portion of the closure member. The first set of pins is located proximate to a rear end of the flat recessed portion and a distance inside of the width. This first set of pins abuts a side of the lap seat belt and restrains the side from engaging the rectangular clasping member.

The improved seat belt adjuster of claim may also comprise a first, second, third and fourth pins projecting upwards from the top surface of the frame member and located at a corresponding first, second, third and fourth corners of the rectangular opening.

DETAILED DESCRIPTION OF THE INVENTION

Figure 1:
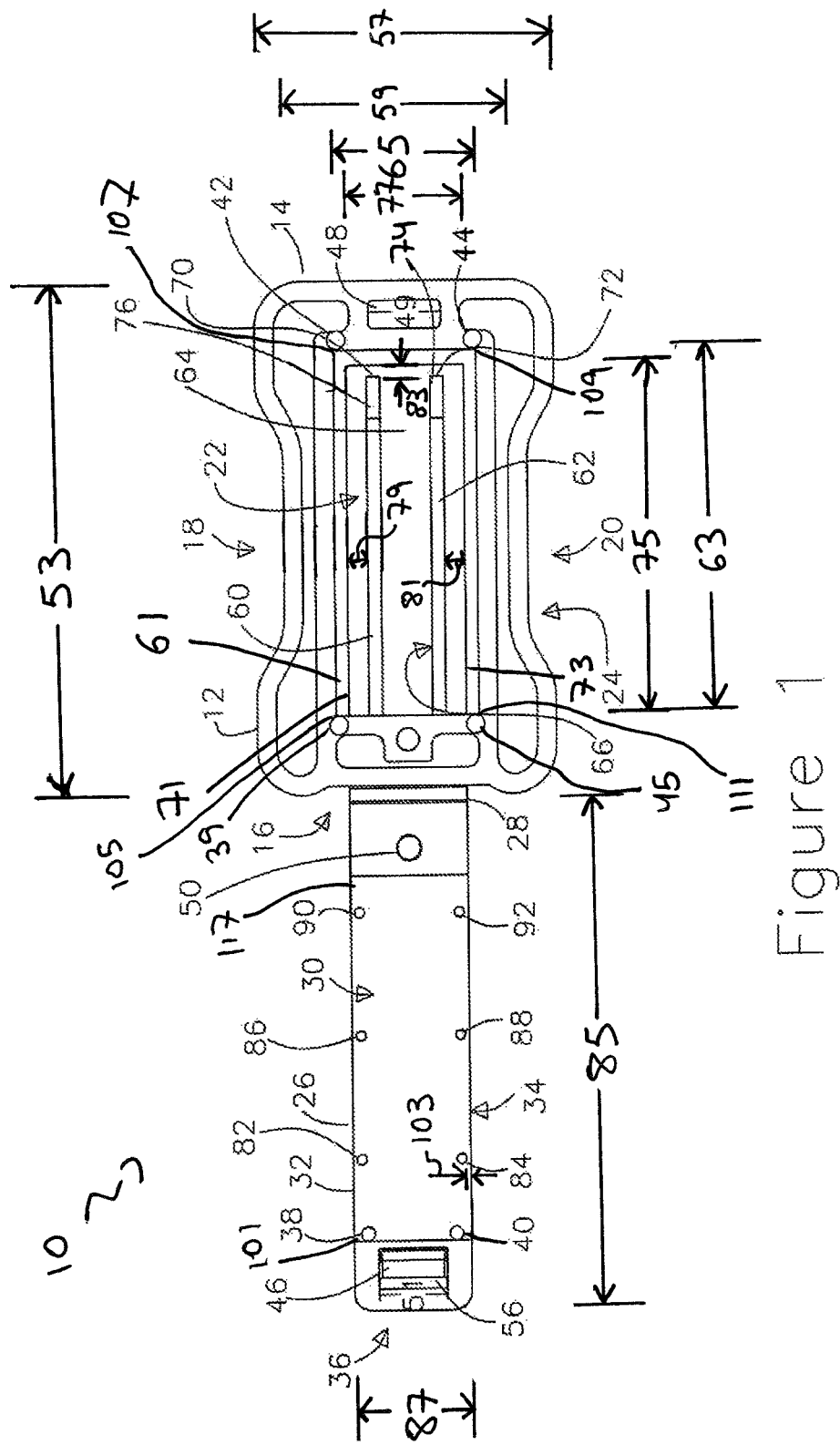
FIG. 1 is a top view a preferred embodiment of the invention.

Referring to FIG. 1 there is shown one embodiment of the improved seat belt adjuster 10 comprising a fixed framed member 12. Frame member 12 comprises a front end 14 a rear end 16, a first side 18, a second side 20, a top surface 22, a bottom surface 24, a length 53, a first width 57 and a second width 59. The second width is less than the first width giving the frame member a pinched appearance. The frame member encloses a rectangular opening 61, seen in FIG. 1, having a length 63 and a width 65.

Figure 2:
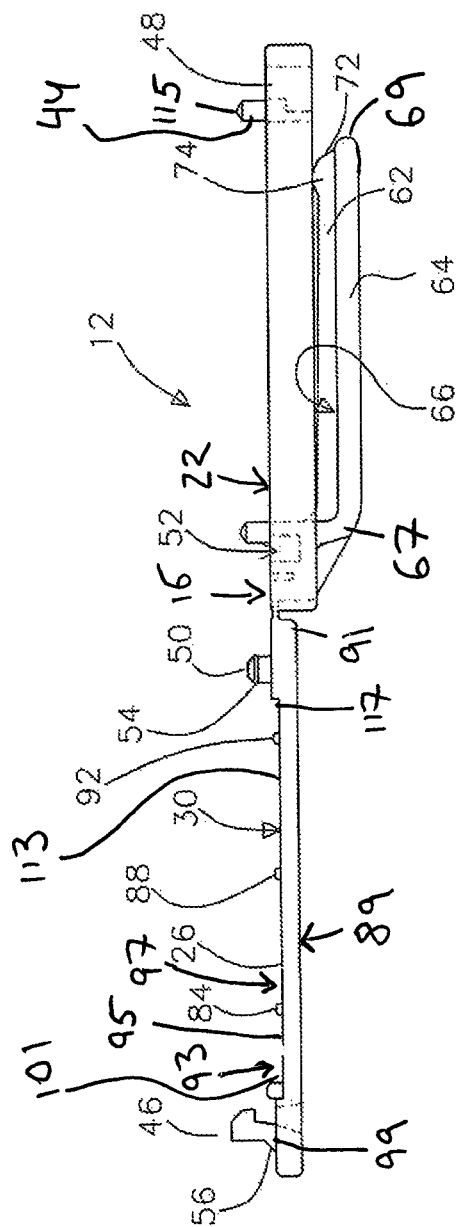
FIG. 2 is a side view of a preferred embodiment of the invention.
Figure 3:
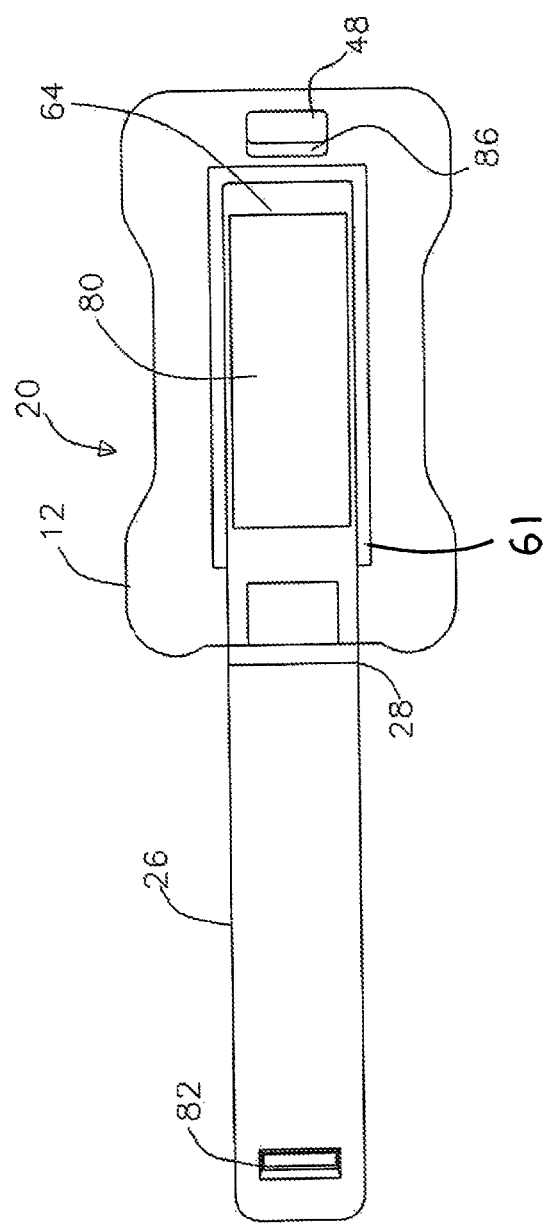
FIG. 3 is a bottom view of a preferred embodiment of the invention.

The frame member 12 further comprises a shoulder belt clip member 64, seen in FIGS. 2 and 3, having a first end 67 fixed to rear end 16 of the frame member at the bottom surface 24 of the frame member and a free end 69 extending towards the front end 14 of the frame member. The clip member terminates adjacent to the front end of the frame member. As seen in FIG. 1, the clip member 64 has a first side 71 and a second side 73 and it is angled towards the rectangular opening 61. As seen in FIG. 1, the clip member includes a length 75 and width 77 which is less than the length 63 and width 65 of the rectangular opening 61. The clip member also includes a first and second parallel stiffening ridges 60 and 62 projecting from a top surface 66 of the clip member, seen in FIG. 2. As seen in FIG. 1, the first parallel ridge 60 is disposed a first distance 79 inside of the first side 71 of the clip member 64. The second parallel ridge 62 is disposed the same distance, as shown by distance 81 in FIG. 1, inside of the second side 73 of the clip member. The two parallel stiffening ridges 60 and 62 commence at the fixed first end 67 of the frame member 12, as seen in FIG. 2, and terminate at terminal or distal ends 70 and 72, seen in FIG. 1, a second distance 83 inside the free end 69 of the clip member 64.

As seen in FIG. 1, the invention also includes a closure or tongue member 26 having a length 85 and a width 87, top surface 30, a bottom surface 89 seen in FIG. 2, a first side 32 and a second side 34. The tongue member further comprises a fixed end 91, seen in FIG. 2, fixed to the top surface 22 of the rear end 16 of the frame member 12 by a hinge 28 located at said fixed end 91. Thus, the tongue member 26 is attached to the rear end 16 of frame member 12 by way of hinge 28 which allows the tongue member 26 to fold over to a position on top of and adjacent to the top surface 22 of the frame member 12. The tongue member 26 pivots or folds from an open position to a closed position over the frame member thereby enclosing the lap seat belt. The tongue member 26, hinge 28 and frame member 12 are integrally molded into a single piece.

A back or free end 36 of the tongue member has a rectangular clasping member or snap hook 46 projecting therefrom. There is also a flat recessed portion 93, seen in FIG. 2, between the fixed end 91 of the tongue member 26 and the free end 36 of the tongue member which defines a top 113 of a lap seat belt containment channel 97.

The seat belt adjuster 12 includes a first, second, third and fourth pins 39, 42, 44 and 45 projecting upwards from the top surface 22 of the frame member 12 and located at a corresponding first, second, third and fourth corners 105, 107, 109, and 111 of the rectangular opening 61 shown in FIG. 1. As seen in FIG. 2, the pins define a bottom 115 of the lap seat belt containment channel 97. As seen in FIG. 1, there is further illustrated a first pin 38 and a second pin 40 protruding from the top surface 30 of the tongue member 26. Pins 38 and 40 close between pins 42 and 44 of frame member 12 when tongue 26 is folded over the frame member to enclose a shoulder belt and a seat belt. It was found that the belt was being caught in the snap hook 46 because it would override pins 42 and 44 and get into the path of the closure snap 46 entering the closure snap receiving aperture 48. The addition of pins 38 and 40 prevent that from happening.

FIG. 2 shows a profile view of the improved seat belt adjuster. As seen in FIG. 2, a circular fastening pin 50 is located proximate to the fixed end 91 of the tongue member 26. Referring to FIG. 2 with FIG. 1 pin 50 of the tongue member 26 engages with a circular recess 52 in the frame member 12 when tongue member 26 is folded over on top of and adjacent to frame member 12. Pin 50 includes a chamfer 54 which when engaged with recess 52 provides for a much more aggressive locking means to hold the two members 26 and 12 together.

A rectangular aperture or recess 48 in the frame member receives snap member 46. Still referring to FIGS. 1 and 2 and snap member 46, there is included at the base 99 of snap member 46 a chamfer 56 which provides for a more aggressive snap sound when the snap is engaged with recess 48 to ensure the wearer that the seat belt adjuster is properly engaged.

Referring to FIG. 1, ridges 60 and 62 run parallel and coaxial with shoulder belt clip member 64. In hot weather the internal temperature of an automobile may exceed 120° F. and it was noted that shoulder belt clip member 64 would soften to the point where the seat belt would be able to disengage from the adjuster mechanism. Therefore ridges 60 and 62 have been added to the top surface 66 of shoulder belt clip member 64 in order to provide additional thermal mass and stiffness to the shoulder belt clip member 64 so that it does not deform in hot weather. Additionally the distal ends 70 and 72 of each of the ridges 60 and 62 include a belt retaining rounded projection 74 and 76 to inhibit the belt from disengaging the seat belt adjuster mechanism. Aperture 48 has a width 49 that is identical to the width 51 of closure snap 46 so that when engaged the fit is tight and resilient to hot weather softening of the material.

Still referring to FIGS. 1 and 2 the top surface 30 of tongue member 26 includes a series of three pairs of evenly spaced pins 82, 84, 86, 88, 90 and 92 project therefrom. As seen in FIG. 2, the pins project from top surface 95 of the flat recessed portion 93 of the tongue member. These pins 82, 84, 86, 88, 90 and 92 engage the top surface of the seat belt and when tongue member 26 is folded over and engaged with frame member 12 the pins provide frictional resistance to any movement of the seat belt so that the adjuster does not slip from its desired position. The pins include a first set of pins 82 and 84, seen in FIG. 1, which is located proximate to a rear end 101 of the flat recessed portion 93 of the tongue member 26 and a distance 103 inside of the width 87 of the tongue member 26. This first set of pins abuts a side of the lap seat belt and restrains said side from engaging the snap hook 46. Pins 86, 88, 90 and 92 comprise second, third and fourth sets of pins that are equally spaced between the first set of pins and a front end 117 of the flat recessed portion 93, as seen in FIGS. 1 and 2.

FIG. 3 shows the bottom side 20 of the improved seat belt adjuster 12 comprising tongue member 26 and frame member 12, the bottom portion 80 of shoulder belt clip member 64, aperture 48, hinge 28 and the base 82 of clasping member 46. Seat member 86 receives a projection 88 in a snap-in relationship so that the tongue member 26 is not easily disengaged from frame member 12 during hot weather.

What is claimed is:

1. An improved seat belt adjuster for holding a shoulder belt to a lap seat belt, the improved seat belt adjuster comprising:
   a) a frame member having a top surface, a bottom surface, a front end, a rear end, a first side, a second side, a length, a first width and a second width less than said first width, wherein said frame member encloses a rectangular opening having a length, a width, and first, second, third and fourth corners; wherein the frame member comprises:
      i) a shoulder belt clip member having a first end fixed to the rear end of the frame member at the bottom surface of the frame member, a free end extending towards the front end of the frame member and terminating adjacent to said front end of the frame member, a top surface, a first side and a second side, wherein said clip member is angled towards said rectangular opening, and wherein the clip member has a length and a width less than said length and said width of the rectangular opening;

ii) first and second parallel stiffening ridges projecting from the top surface of the clip member, wherein said first parallel ridge is disposed a first distance inside of said first side of the clip member, wherein said second parallel ridge is disposed said first distance inside of said second side of the clip member, wherein the first and second parallel stiffening ridges commence at said first end of the clip member and terminate at a terminal end a second distance inside of said free end of the clip member, and wherein each of the first and second parallel stiffening ridges includes a belt retaining rounded projection rising from said terminal end thereof;

iii) a rectangular aperture for receiving a rectangular clasping member;

iv) a circular recess for receiving a circular fastening pin; and v) first, second, third and fourth pins projecting upwards from said top surface of the frame member and located at the first, second, third and fourth corners, respectively, of the rectangular opening, wherein said pins define a bottom of a lap belt containment channel;

b) a closure member having a length and a width, a top surface, a bottom surface, a first side and a second side, said closure member comprising:

i) a fixed end fixed to said top surface of the frame member at the rear end of the frame member;

ii) a binge located at said fixed end of the closure member so that said closure member can pivot from an open position to a closed position over the frame member;

iii) a free end having a said rectangular clasping member projecting therefrom and proximate and adjacent thereto;

iv) a flat recessed portion between the fixed end of the closure member and said free end of the closure member, the flat recessed portion defining a top of the lap belt containment channel, the flat recessed portion having a top surface and a rear end;

v) said circular fastening pin disposed proximate to the fixed end of the closure member; and vi) a first set of pins projecting from the top surface of said flat recessed portion, the first set of pins being located proximate to the rear end of said flat recessed portion and a distance inside of said width of the closure member, said first set of pins abutting a side of the lap seat belt and restraining said side of the lap seat belt from engaging the rectangular clasping member.

2. The improved seat belt adjuster of claim 1 wherein said closure member further comprises at least a second, third and fourth set of pins projecting from said top surface of the flat recessed portion and being equally spaced between said first set of pins and a front end of the flat recessed portion, wherein said at least second, third and fourth set of pins frictionally engage a surface of the lap belt to retain the improved seat belt adjuster in a desired location on the lap belt.

3. The improved seat belt adjuster of claim 2 wherein the circular fastening pin has a chamfered top end for frictional engagement with said circular recess.

4. An improved seat belt adjuster for holding a shoulder belt to a lap seat belt, the improved seat belt adjuster comprising:

a frame member having an opening, the opening being rectangular, the frame member having a top surface, and the frame member having first, second, third and fourth pins projecting upwards from the top surface thereof, the pins being located at corresponding first, second, third and fourth corners of the opening, the pins defining a bottom of a lap seat belt containment channel;

a closure member for receiving the lap seat belt, the closure member hingedly connecting to the frame member so that said closure member can pivot from an open position to a closed position over the frame member, the top surface of the frame member facing the closure member when in the closed position; and a shoulder belt clip member for receiving the shoulder belt, the clip member connecting to and extending outwards from the frame member and angling towards said opening, the clip member having first and second parallel stiffening ridges.

5. The seat belt adjusting as claimed in claim 4, wherein the first and second parallel stiffening ridges further include belt retaining rounded projections rising from terminal ends thereof.

6. The seat belt adjuster as claimed in claim 4, wherein the frame member has a bottom surface which is spaced-apart from the top surface, the shoulder belt clip member fixedly connecting to the bottom surface of the frame member and the closure member connecting to the top surface of the frame member in the closed position of the frame member.

7. The seat belt adjuster as claimed in claim 4, wherein the frame member includes a recess and wherein the closure member further includes a fastening pin that engages the recess when the closure member is folded on top of and adjacent to the frame member, the fastening pin including a chamfer which holds the closure member and the frame member together.

8. An improved seat belt adjuster for holding a shoulder belt to a lap seat belt, the improved seat belt adjuster comprising:

a frame member having an opening and a recess;

a shoulder belt clip member for receiving the shoulder belt, the clip member connecting to and extending outwards from the frame member and angling towards said opening; and a closure member for receiving the lap seat belt, the closure member hingedly connecting to the frame member so that said closure member can pivot from an open position to a closed position over the frame member, the closure member having a clasping member that is received by the recess, a top surface that faces the frame member when in the closed position, a first side, a second side which is spaced-apart from the first side and a pair of pins protruding from the top surface of the closure member, the pins being positioned adjacent to the clasping member and adjacent to respective ones of the sides of the closure member.

9. The seat belt adjuster as claimed in claim 8, wherein the closure member has a front end and a rear end which is spaced-apart from the front end, and also includes a further series of pairs of evenly spaced-apart pins projecting from the top surface of the closure member between the front end and the rear end of the closure member, the further series of pairs of evenly spaced-apart pins being adjacent to respective ones of the sides of the closure member.

10. The seat belt adjuster as claimed in claim 8, wherein the clasping member has a base and a chamfer at the base of the clasping member which provides a snap sound when the clasping member is engaged with the recess to ensure that the seat belt adjuster is properly engaged.

11. The seat belt adjuster as claimed in claim 8, wherein the clasping member has a width and wherein the recess has a width that is substantially equal to the width of the clasping member.

* * * * *

UNITED STATES PATENT AND TRADEMARK OFFICE
CERTIFICATE OF CORRECTION

| | | |
|---|---|---|
| PATENT NO. | : 8,898,865 B2 | Page 1 of 1 |
| APPLICATION NO. | : 13/466987 | |
| DATED | : December 2, 2014 | |
| INVENTOR(S) | : Campbell | |

It is certified that error appears in the above-identified patent and that said Letters Patent is hereby corrected as shown below:

IN THE CLAIMS

Col. 4&5 line 54-56, claim 1, should read

An improved seat belt adjuster for holding a shoulder belt to a lap seat belt, the improved seat belt adjuster comprising:

b) a closure member having a length and a width, a top surface, a bottom surface, a first side and a second side, said closure member comprising:
i) a fixed end fixed to said top surface of the frame member at the rear end of the frame member;
ii) a hinge located at said fixed end of the closure member so that said closure member can pivot from an open position to a closed position over the frame member;
iii) a free end having said rectangular clasping member projecting therefrom and proximate and adjacent thereto;
iv) a flat recessed portion between the fixed end of the closure member and said free end of the closure member, the flat recessed portion defining a top of the lap belt containment channel, the flat recessed portion having a top surface and a rear end;
v) said circular fastening pin disposed proximate to the fixed end of the closure member; and
vi) a first set of pins projecting from the top surface of said flat recessed portion, the first set of pins being located proximate to the rear end of said flat recessed portion and a distance inside of said width of the closure member, said first set of pins abutting a side of the lap seat belt and restraining said side of the lap seat belt from engaging the rectangular clasping member.

Signed and Sealed this
Twenty-sixth Day of May, 2015

Michelle K. Lee
*Director of the United States Patent and Trademark Office*